H. B. DEKEN.
COTTON CHOPPER.
APPLICATION FILED JULY 14, 1908.

928,112.

Patented July 13, 1909.
2 SHEETS—SHEET 1.

Witnesses
J. L. Wright

Inventor
Henry B. Deken,
By Victor J. Evans,
Attorney

H. B. DEKEN.
COTTON CHOPPER.
APPLICATION FILED JULY 14, 1908.
928,112.
Patented July 13, 1909.
2 SHEETS—SHEET 2.
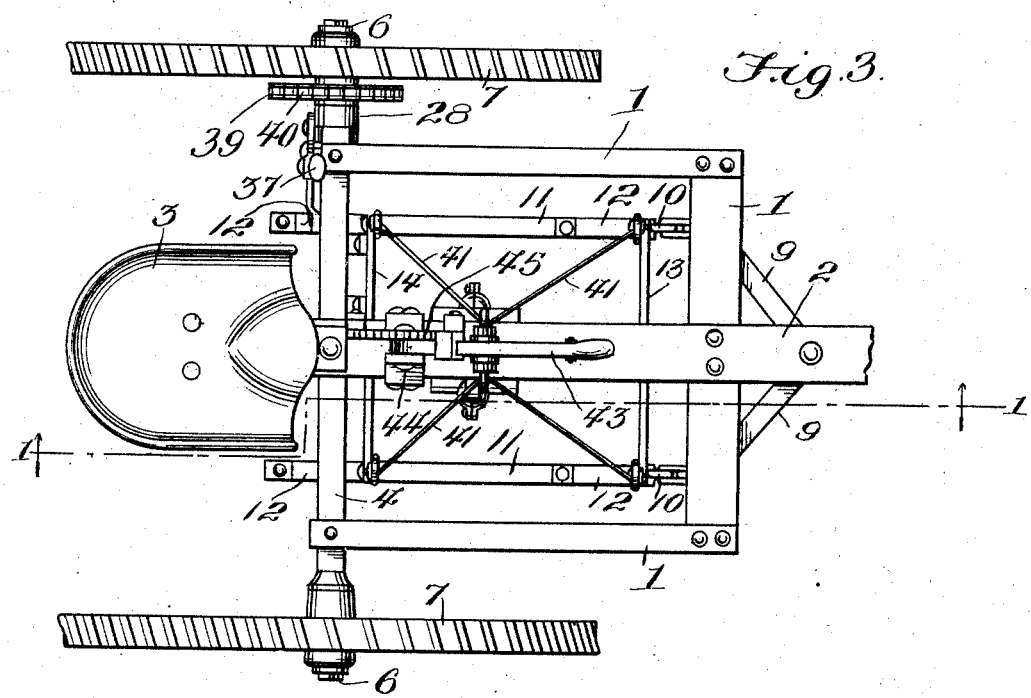
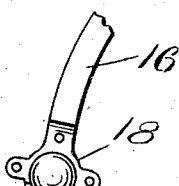
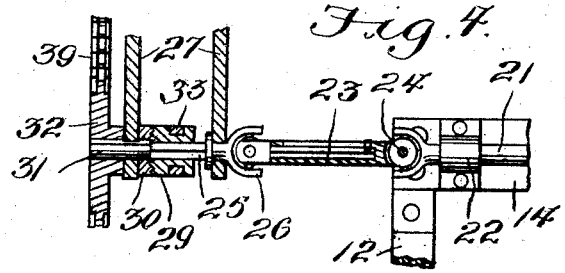
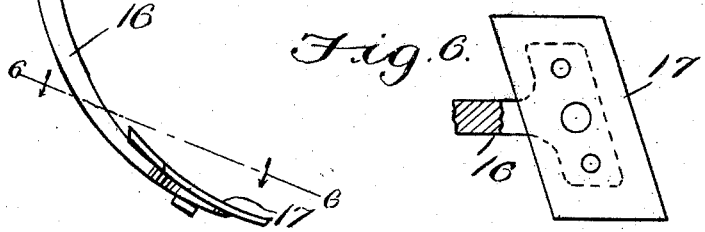
Witnesses
Inventor
Henry B. Deken,
By Victor J. Evans,
Attorney

UNITED STATES PATENT OFFICE.

HENRY B. DEKEN, OF ST. LOUIS, MISSOURI.

COTTON-CHOPPER.

No. 928,112.　　　Specification of Letters Patent.　　　Patented July 13, 1909.

Application filed July 14, 1908. Serial No. 443,439.

*To all whom it may concern:*

Be it known that I, HENRY B. DEKEN, a citizen of the United States of America, residing at St. Louis, in the State of Missouri, have invented new and useful Improvements in Cotton-Choppers, of which the following is a specification.

This invention relates to cotton choppers, and one of the principal objects of the invention is to provide a cotton chopper of simple construction which will operate efficiently on all kinds of plants and in which the hoes are reversible and in which provision is made for permitting the hoes to yield in case an obstruction is encountered.

Another object of the invention is to provide a cotton chopper with a pair of runners in which the shaft of the chopper is journaled, means being provided for raising said runners out of operative position when passing over the ground.

These and other objects may be attained by means of the construction illustrated in the accompanying drawings, in which,—

Figure 1:
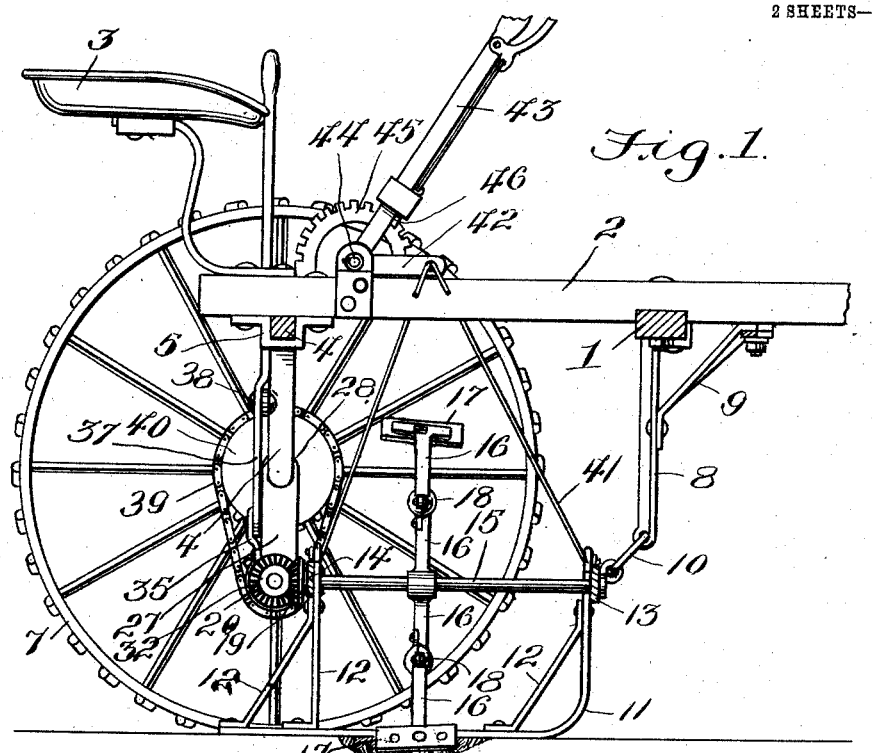
Figure 2:
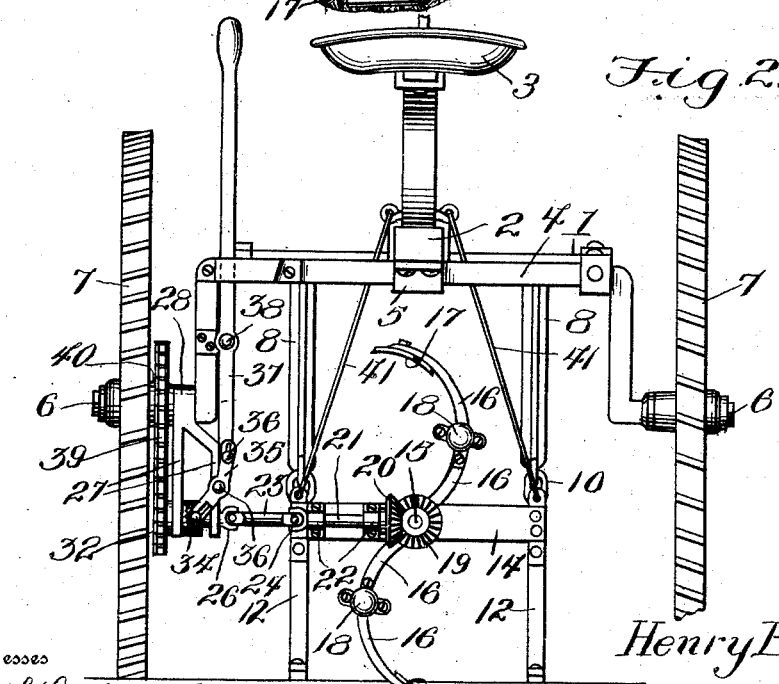

Figure 1 is a longitudinal section of a cotton chopper made in accordance with my invention. Fig. 2 is a rear elevation of the same. Fig. 3 is a top plan view of the chopper. Fig. 4 is a detail sectional view of a jointed shaft and its connections to the drive wheel. Fig. 5 is a detail side elevation of one of the chopper arms. Fig. 6 is a sectional view on the line 6—6 of Fig. 5, looking in the direction indicated by the arrow.

Referring to the drawings, the numeral 1 designates a substantially rectangular frame, and secured on top of this frame is a suitable driver's seat 3. The arched axle 4 is secured in suitable keepers 5 bolted to the frame 1 and to the tongue 2. On the lower ends of the arched axle 4 are the wheel spindles 6, and the ground wheels 7 are mounted on these spindles and provided with a roughened surface to prevent slipping on the ground.

Depending from the frame 1 in front is a hanger 8, and diagonal braces 9 extend from the draft tongue 2 to said hanger. Connected to said hanger 8 by a link 10 are the two metal runners 11, said runners being curved in front to run over the ground and provided with suitable braces 12, front and rear. Cross bars 13 and 14 extend from one runner 11 to the other and are firmly secured thereto. The chopper shaft 15 is journaled in the cross bars 13 and 14.

Mounted on the shaft 15 are oppositely curved chopper arms 16, said arms having reversible chopper blades or hoes 17 secured thereto at their outer ends. The arms 16 are formed in two sections connected together by a ball and socket joint 18 which connects the two sections 16 frictionally, but which will permit the outer section to yield in case one of the hoes strikes an obstruction, thus preventing the breakage of the blade or the arm.

On the end of the shaft 15 is a beveled gear 19 which meshes with a similar gear 20 on a shaft 21 journaled in keepers 22 secured to the cross bar 13. The shaft 21 is connected to a link 23 by a universal joint 24, said link 23 being connected to a squared shaft 25 by means of a universal joint 26. The squared shaft 25 is supported in a hanger 27, the upper end 28 of which is journaled upon one of the spindles 6 of the arched axle 4.

Fitted upon the axle 25 is a clutch member 29 which is adapted to engage a similar clutch member 30 mounted upon an extended rounded portion 31 of the squared shaft 25. A sprocket wheel 32 is fixed to the outer end of the rounded portion 31. A yoke 33 is connected to the clutch member 29, said yoke having a trunnion 34 upon one side which is connected by a pivoted link 35, said link being pivoted at 36 and provided with slotted ends, one of said slots engaging the trunnion 34 and the other engaging a pin 36 on a lever 37, said lever being pivoted at 38. A drive chain 39 extends around the sprocket wheel 32 and around a sprocket wheel 40 on one of the spindles 6.

The runners 11 are adapted to be raised and lowered by means of the wire connections 41, said wire connections being attached to the runners at the front and rear and extended upward and connected to an arm 42 of a lever 43, said lever being pivoted at 44 upon the tongue 2. A suitable rack 45 is provided for the sliding bolt 46 connected to the lever 43. By moving the lever 43 backwardly the runners 11 are raised from the ground, and by moving the lever 37 outwardly the clutch member 29 is disengaged from the clutch face 30, thus stopping the revolution of the shaft 15.

From the foregoing it is believed that the construction and operation of my invention will be clearly understood. The machine is simple in construction, cannot readily get out of order; the hoes will yield in case an obstruction is encountered; the runners may be readily raised and lowered and the shipping lever operated to throw the clutch into and out of operation, and the knives may be readily reversed when dull.

I claim:—

1. In a cotton chopper, the combination of a shaft, chopper arms mounted on said shaft, said arms being curved and comprising two sections, said sections being connected together by ball and socket joints to permit said joints to yield when an obstruction is encountered, and means for rotating said shaft.

2. In a cotton chopper, the combination of a pair of runners, cross bars connecting said runners, a shaft journaled in said cross bars, curved chopper arms connected to said shaft, a beveled gear on said shaft, another shaft supported on one of said cross bars, a beveled gear on said shaft, a link connected to said shaft by a universal joint, a squared shaft connected to said link by a universal joint, a clutch member on said shaft, and means for operating said clutch member to throw the chopper shaft into and out of operation.

In testimony whereof I affix my signature in presence of two witnesses.

HENRY B. DEKEN.

Witnesses:
Wm. R. Duesing,
John Huffeld.